United States Patent
Schooley et al.

(10) Patent No.: US 9,932,810 B2
(45) Date of Patent: Apr. 3, 2018

(54) OIL RECOVERY PROCESS INCLUDING A HIGH SOLIDS CRYSTALLIZER FOR TREATING EVAPORATOR BLOWDOWN

(71) Applicant: Veolia Water Technologies, Inc., Moon Township, PA (US)

(72) Inventors: Karen Schooley, Seattle, WA (US); Donald A. Boudreau, Jr., Naperville, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 418 days.

(21) Appl. No.: 14/724,113

(22) Filed: May 28, 2015

(65) Prior Publication Data
US 2015/0345278 A1 Dec. 3, 2015

Related U.S. Application Data

(60) Provisional application No. 62/006,580, filed on Jun. 2, 2014.

(51) Int. Cl.
| | |
|---|---|
| *E21B 43/40* | (2006.01) |
| *E21B 43/24* | (2006.01) |
| *B01D 1/18* | (2006.01) |
| *C02F 1/20* | (2006.01) |
| *C02F 1/40* | (2006.01) |
| *C02F 1/66* | (2006.01) |
| *B01D 1/00* | (2006.01) |
| *B01D 9/00* | (2006.01) |
| *C02F 9/00* | (2006.01) |
| *C02F 1/04* | (2006.01) |

(Continued)

(52) U.S. Cl.
CPC .............. *E21B 43/40* (2013.01); *B01D 1/007* (2013.01); *B01D 1/18* (2013.01); *B01D 9/004* (2013.01); *B01D 9/0031* (2013.01); *B01D 9/0059* (2013.01); *C02F 9/00* (2013.01); *E21B 43/24* (2013.01); *C02F 1/048* (2013.01); *C02F 1/20* (2013.01); *C02F 1/40* (2013.01); *C02F 1/66* (2013.01); *C02F 2001/5218* (2013.01); *C02F 2101/32* (2013.01)

(58) Field of Classification Search
None
See application file for complete search history.

(56) References Cited

U.S. PATENT DOCUMENTS

| 4,160,812 A | 7/1979 | Conroy et al. |
|---|---|---|
| 4,654,064 A | 3/1987 | Cheng et al. |

(Continued)

FOREIGN PATENT DOCUMENTS

WO 2014042824 A1 3/2014

*Primary Examiner* — Matthew R Buck
*Assistant Examiner* — Douglas S Wood
(74) *Attorney, Agent, or Firm* — Coats & Bennett PLLC

(57) ABSTRACT

An oil recovery process is provided where an oil-water mixture is recovered from an oil-bearing formation. Oil is separated from the oil-water mixture to yield produced water. The produced water is typically subjected to a pre-treatment process. After pre-treatment, the produced water is directed to an evaporator that evaporates at least some of the produced water and produces steam and an evaporator blowdown. The evaporator blowdown is directed to a dual stage crystallizer that concentrates the evaporator blowdown.

13 Claims, 2 Drawing Sheets

(51) Int. Cl.
*C02F 1/52* (2006.01)
*C02F 101/32* (2006.01)

(56) References Cited

U.S. PATENT DOCUMENTS

| | | |
|---|---|---|
| 5,028,302 A | 7/1991 | Rutherford |
| 9,650,555 B2* | 5/2017 | Harrison ................ B01D 21/00 |
| 2006/0032630 A1 | 2/2006 | Heins |
| 2009/0056945 A1 | 3/2009 | Minnich et al. |
| 2010/0193732 A1 | 8/2010 | Hook et al. |
| 2012/0087737 A1 | 4/2012 | Minnich et al. |
| 2013/0269943 A1 | 10/2013 | Gamache et al. |
| 2014/0072507 A1 | 3/2014 | Chastain et al. |
| 2014/0299529 A1* | 10/2014 | Govind ................ C02F 1/4693 |
| | | 210/195.2 |
| 2015/0292314 A1* | 10/2015 | Xia .......................... C02F 9/00 |
| | | 166/266 |

* cited by examiner

OIL RECOVERY PROCESS INCLUDING A HIGH SOLIDS CRYSTALLIZER FOR TREATING EVAPORATOR BLOWDOWN

FIELD OF THE INVENTION

The present invention relates to systems and processes for recovering oil from oil-bearing formations and more particularly to an improved process for treating produced water with an evaporator and concentrating evaporator blowdown produced by the evaporator.

BACKGROUND OF THE INVENTION

Enhanced oil recovery (EOR) processes employ thermal energy to facilitate the recovery of oil, particularly heavy oil, from oil-bearing formations. One particular process widely used in Canada for recovering heavy oil is referred to as steam assisted gravity drainage (SAGD). In a SAGD process, steam is injected into the oil-bearing formation. Generally, several tons of steam is required for each ton of oil recovered. In this process, steam heats the oil in the oil-bearing formation and this reduces the viscosity of the oil and facilitates the flow of oil to a collection area. In this process, however, steam condenses and mixes with the oil to form an oil-water mixture. The mixture of oil and water is pumped to the surface and oil is separated from the water by conventional processes that form what is referred to as produced water.

In some SAGD processes, evaporators are used. They evaporate produced water and produce a distillate that is directed to a steam generator that produces steam that is injected into an oil-bearing formation. The steam injected into the oil-bearing formation facilitates the removal of oil from the formation. Evaporators also produce a blowdown. In many cases, evaporator blowdown is not suitable for disposal by deep well injection. This means that the evaporator blowdown must be further concentrated before disposal. It is known to use conventional crystallizers to concentrate evaporator blowdown. Generally the maximum concentration of evaporator blowdown in conventional crystallizers is on the order of 55-60% total solids (TS). The total solids concentration achievable by conventional crystallizers in SAGD processes is limited by the viscosity of the blowdown, scaling and the energy required to evaporate the blowdown. The lower the concentration total solids in the treated evaporator blowdown, the greater the disposal volumes and the higher the operating costs for the process.

SUMMARY OF THE INVENTION

The present invention relates to a process for recovering oil from an oil-bearing formation and treating resulting produced water. After pre-treatment, the produced water is directed to an evaporator that evaporates at least a portion of the produced water and produces steam and an evaporator blowdown. The evaporator blowdown is directed to a dual stage crystallizer. In a first stage of the crystallizer, the evaporator blowdown is concentrated to a first concentration level. Then the concentrated evaporator blowdown in the first stage is transferred to a second stage in the crystallizer where the evaporator blowdown is further concentrated to a second higher concentration level.

In one particular embodiment, the evaporator blowdown is concentrated to approximately 60-65% TS in the first stage of the crystallizer and concentrated to approximately 70-75% TS in the second stage of the crystallizer.

Moreover, in one embodiment of the present invention, the dual stage crystallizer operates such that in one mode the relatively high solids concentration takes place in the first stage while the relatively low solids concentration takes place in the second stage, and in a second mode the operation is reversed such that the relatively high solids concentration takes place in the second stage while the relatively low solids concentration takes place in the first stage. Thus, in carrying out the process of the present invention, the feed of the evaporator blowdown alternates between the first and second stages in the crystallizer. That is, in one mode, the evaporator blowdown feed is directed to the first stage and in another mode the evaporator blowdown feed is directed to the second stage.

DESCRIPTION OF EXEMPLARY SYSTEM AND PROCESS

The process disclosed herein is a process for recovering oil, particularly heavy oil such as recovered by SAGD processes, from oil wells and oil-bearing formations. Heavy oil is typically removed by injecting steam into oil-bearing underground formations. Steam heats the oil in the oil-bearing formation and in the process the steam condenses. This produces an oil-water mixture. The oil-water mixture is pumped to the surface. An oil-water separation process follows where oil is separated from the mixture. This leaves what is referred to as produced water. The produced water is reused to generate steam that is directed back into the oil-bearing formation.

As discussed in more detail below, the produced water is subjected to a number of pre-treatment processes in the embodiment shown in FIG. 1. For example, the produced water is preheated, deaerator and subjected to one or more other pre-treatment steps before reaching evaporator 34. As discussed below, a high pH caustic softening process can be employed upstream of the evaporator. In addition, as will be discussed subsequently herein, the concentrated brine produced by the evaporator 34 typically includes a 20-25% total solids (TS) concentration. This brine is directed to a crystallizer, indicated generally by the numeral 50. In one embodiment, the function of the crystallizer 50 is to increase the solids concentration of the evaporator brine from 20-25% TS to approximately 70-75% TS. As will be detailed below, the crystallizer 50 is split into two sections and performs what might be appropriately characterized as a phased concentration process. In one example, the brine from the evaporator 34 is fed into one section of the crystallizer 50 and substantially concentrated. At a selected concentration level, the concentrated brine is transferred to the other section of the crystallizer 50 where the brine is further concentrated. Once a selected concentration level is achieved in the second section of the crystallizer 50, the further concentrated brine is purged. As noted above, this is a general discussion of the function of the crystallizer 50 and further details will be forthcoming.

Figure 1:
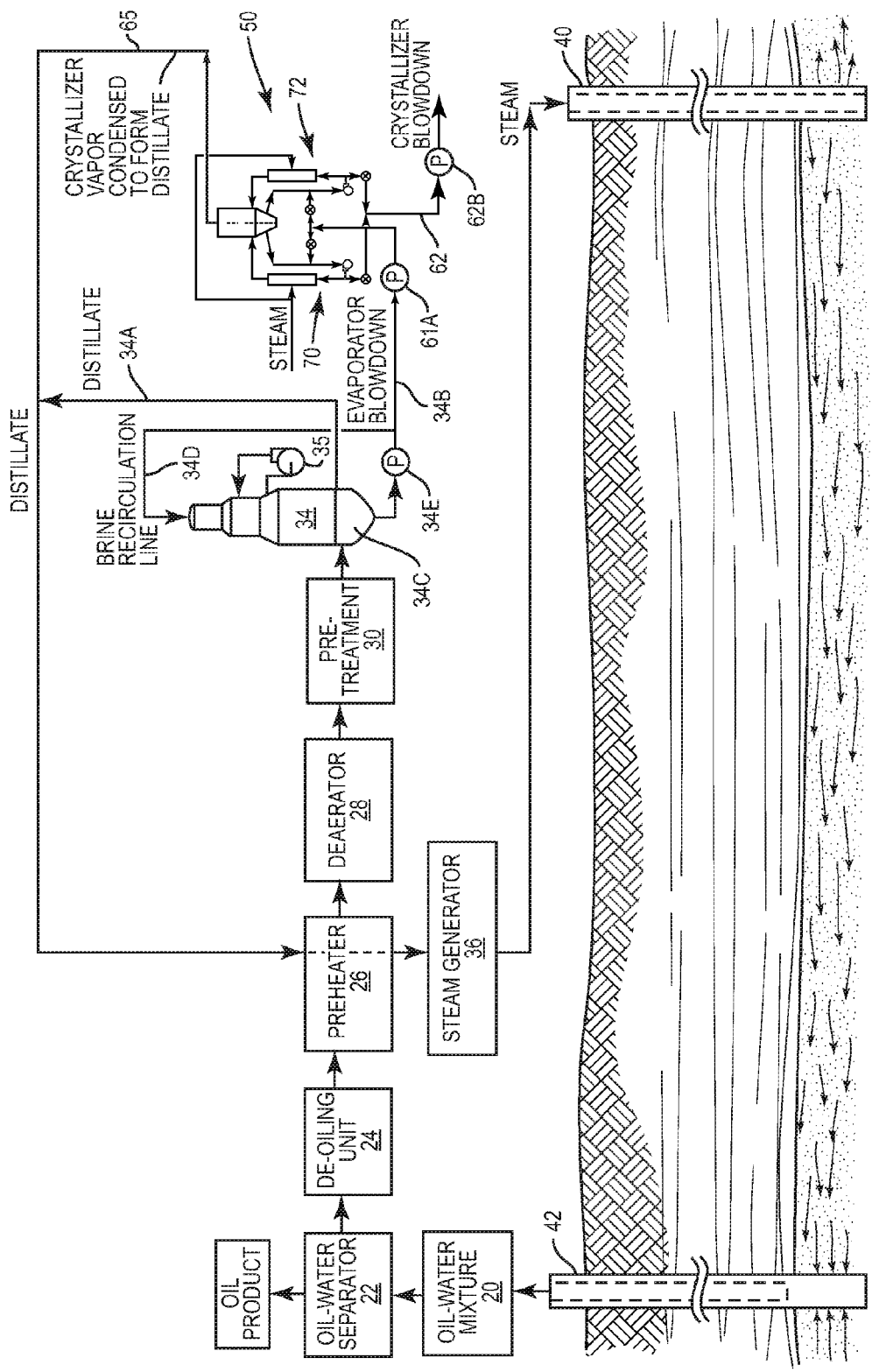
FIG. 1 is a schematic illustration of a SAGD process incorporating a high solids concentrating crystallizer.

With reference to FIG. 1, there is shown therein an oil recovery system and process that is indicated generally by the numeral 10. An oil-water mixture 20 is collected from the oil well 42 and pumped to the surface. The oil-water mixture is directed to an oil-water separator 22. This is generally referred to as a primary oil-water separation process. Various conventional oil-water separation systems can be employed. For example, gravity or centrifugal separators can be used to separate the oil-water mixture to yield an oil product and separated water. The oil product can be further treated and sold. Separated water is directed to a de-oiling unit 24 where additional oil is removed. Various de-oiling devices, such as a dissolved air flotation system, can be used. In some instances, a de-oiling polymer is added to the water separated by the oil-water separator 22. The output or effluent from the de-oiling unit 24 is referred to as produced water. It is this produced water that is treated and conditioned before being reused to generate steam.

Produced water from the de-oiling unit 24 is directed to and through a preheater 26 where the produced water is heated. Various types of preheaters can be utilized. In one embodiment, the preheater 26 includes a heat exchanger through which the produced water passes. Various heat sources can be utilized to supply heat to the preheater 26. In one embodiment, a distillate stream produced by a downstream evaporator is directed through the preheater 12 for heating the produced water passing therethrough.

From the preheater 26, the produced water is directed to a deaerator 28 that removes oxygen, carbon dioxide and other non-condensable gases from the produced water passing through the deaerator. It should be noted that preheating and deaerating the produced water is optional.

Downstream of the deaerator is a pre-treatment unit indicated by the numeral 30. As discussed above, a multitude of pre-treatment processes could be incorporated here in order to condition the produced water prior to entering the downstream evaporator 34. One exemplary pre-treatment process will be discussed. The exemplary pre-treatment process is a high pH caustic softening process. In this example, the pH of the water is raised from approximately 10 to approximately 11. The softening process can be enhanced by recycling a portion of the concentrated brine produced by the downstream evaporator 34 to one or more softening tanks that form a part of the softening unit. The concentrated brine has a relatively high pH and can be mixed with the produced water and the softening reagent in the softening unit to increase the pH of the produced water. Therefore, in this example, it is appreciated that raising the pH of the produced water in the softening unit is accomplished by mixing both the softening reagent or reagents and a portion of the concentrated brine with the produced water.

Generally raising the pH of the produced water to a pH range of approximately 10 to approximately 11 has the effect of lowering the solubility limits of hardness compounds such as calcium carbonate and magnesium hydroxide. This results in these hardness compounds precipitating from the produced water. By precipitating hardness from the produced water, scaling due to hardness in downstream equipment is avoided or at least significantly reduced. In particular, it is hypothesized that by precipitating hardness compounds upstream of process equipment that the precipitated hardness compounds will tend to flow through the process equipment, such as the heat transfer tubes of the evaporator 34, without significantly scaling the surfaces thereof.

Figure 2:
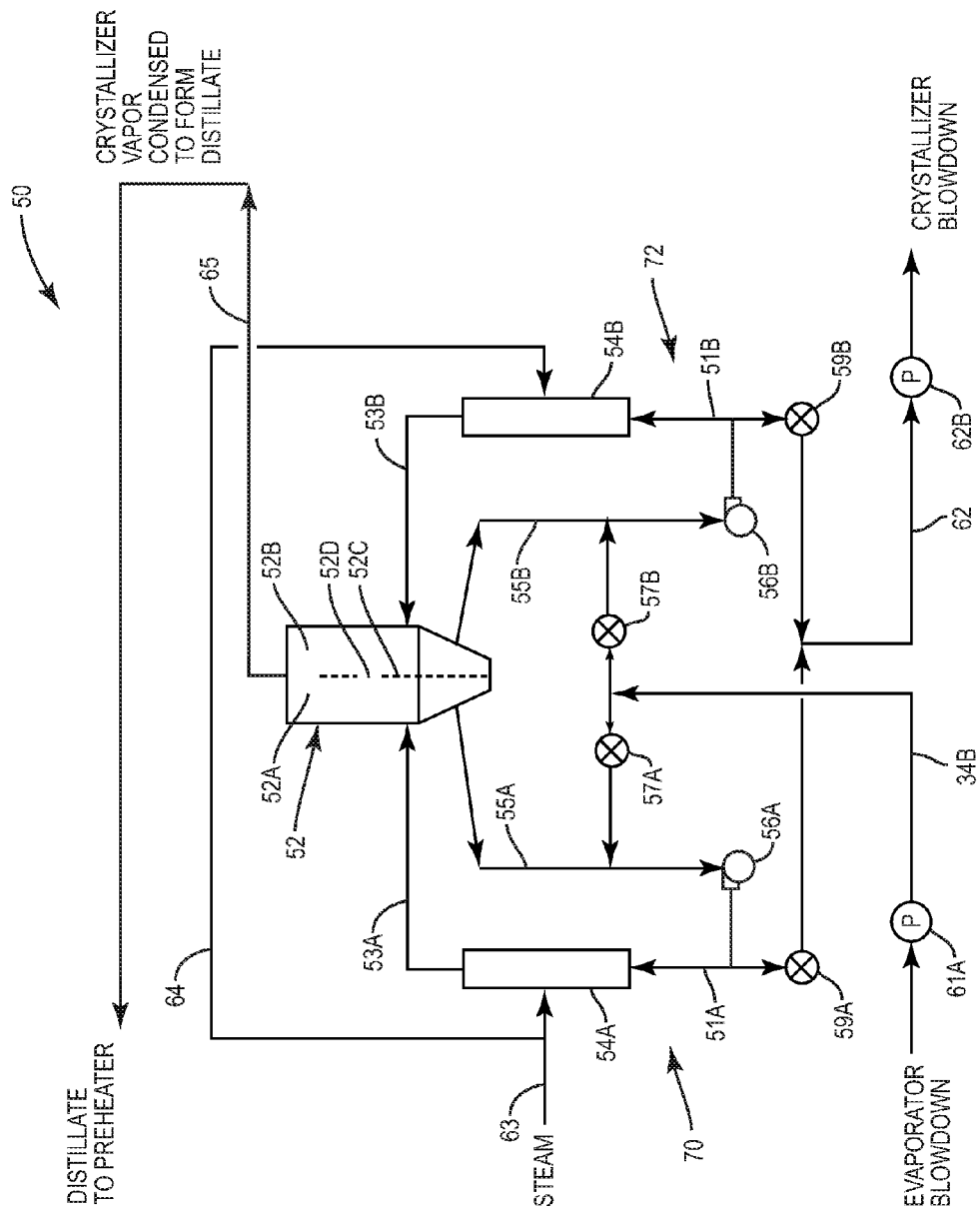
FIG. 2 is a schematic illustration of the high solids concentrating crystallizer incorporated into the SAGD process shown in FIG. 1.

Various other pre-treatments can be incorporated into the method or process of the present invention. For example, the process of the present invention can include caustic softening plus incorporating a high pH process in the evaporator with the blowdown from the evaporator being treated with a crystallizer such as that disclosed hereafter and shown in FIGS. 1 and 2. Operating the evaporator at a high pH tends to maintain silica soluble and has the potential to result in a significant reduction of silica scaling.

In addition, the pre-treatment process could mix magnesium oxide or magnesium chloride with the produced water or even the concentrated brine produced by the downstream evaporator. Mixing magnesium oxide or magnesium chloride with the produced water or the concentrated brine results in forming magnesium hydroxide. The formation of magnesium hydroxide will co-precipitate magnesium hydroxide and silica from the produced water or the concentrated brine. Another way of expressing this process is that the silica in solution in the produced water or concentrated brine will be adsorbed onto the magnesium hydroxide precipitants.

Raising the pH of the produced water upstream of the evaporator 34 has other advantages. Produced water typically has a significant concentration of silica or silica-based compounds. It is not uncommon to find silica present in produced water at about 200 mg/L (as $SiO_2$). By raising the pH of the produced water to a range of 10-11 lessens silica scaling in addition to hardness scaling. By adding a softening reagent such as a caustic to the produced water and raising the pH of the produced water results in increasing the solubility of silica. That is, silica solubility increases substantially with an increase in pH. In the process of FIG. 1, the pH of the produced water is sufficiently raised such that silica or silica-based compounds in the produced water remain in solution as the produced water passes through the evaporator 34. It is appreciated that in practice there may be some suspended silica in the concentrated brine produced by the evaporator 34. However, according to the process contemplated herein, this would be minimal as a majority, or in in some case substantially all, of the silica should remain in solution and eventually pass with the evaporator blowdown.

Downstream of the pre-treatment unit 30 is an evaporator 34. In order to address capacity, there may be provided a series of evaporators. In any event, evaporator 34 produces steam and a concentrated brine. The steam condenses to form a distillate 34A and the distillate is directed through preheater 26 to heat the produced water passing therethrough and from the preheater the distillate is directed to a steam generator 36. Steam generator 36 produces steam that is directed from the steam generator to an injection well 40.

The concentrated brine produced by the evaporator 34 is collected in a sump 34C and recirculated through the evaporator 34 by a pump 34E that pumps the concentrated brine through brine recirculation line 34D. A portion of the concentrated brine produced by the evaporator is purged from the recirculation line 34D and directed as blowdown to the crystallizer 50 briefly discussed above.

Evaporator 34, shown in FIG. 1, may be of various types. For example, the evaporator 34 may be a vertical falling film evaporator, a forced circulation evaporator, a horizontal evaporator or a rising film evaporator. In the case of a vertical falling film evaporator, the same includes an array of vertical tubes, the sump 34C for collecting and holding concentrated brine, a recirculating line 34D leading from the sump to an upper portion of the evaporator for discharging brine into the upper ends of the vertical tubes and a pump 34E disposed in the recirculating brine line for pumping brine from the sump to the upper portion of the evaporator where the brine is discharged into the tubes. When the brine is discharged into the upper ends of the tubes, the brine forms a thin brine film that falls down along the inside surfaces of the tubes. The tubes are heated, resulting in a portion of the brine vaporizing and forming a vapor, and in the process the brine is concentrated and falls into the sump 34C. Evaporator 34, in this example, is a mechanical vapor recompression (MVR) evaporator. The produced vapor is received by a compressor 35 and compressed, producing steam which is directed against the outside of the tubes, again heating the thin film of brine falling downwardly along the inside surfaces of the tubes. The steam condenses and produces the distillate 34A that is directed to the steam generator 36.

The evaporator blowdown, sometimes referred to concentrated brine or brine, is directed to the crystallizer 50 for further concentration. As noted above, typically the evaporator blowdown has a 20-25% TS concentration. In one embodiment, the crystallizer 50 is operative to further concentrate the evaporator blowdown to 70-75% TS.

Turning now to a detailed description of the ultra-high solids crystallizer 50, it is appreciated that the crystallizer includes a body 52, heat exchangers 54A and 54B, recirculation pumps 56A and 56B, and valves 57A, 57B, 59A and 59B. See FIG. 2. Crystallizer body 52 comprises two compartments or sections 52A and 52B, which are separated by a baffle 52C that generally isolates the sections one from another. Baffle 52C includes an opening 52D to permit liquid communication between the sections 52A and 52B.

It is appreciated that crystallizer body 52 provides for the evaporation of liquids circulating therein. This evaporation promotes the crystallization of suspended solids and increases the total solids concentration in the liquid. Line 65 is connected to a head space outlet of the crystallizer body 52 for directing away the liberated vapor. The vapor exhausted through line 65 condenses and forms a distillate that is combined with the distillate 34A produced by the evaporator 34 and the combined distillate is directed through the preheater 26 to the steam generator 36. See FIG. 1.

Operatively associated with the crystallizer body 52 are the heat exchangers 54A and 54B. Heat exchangers 54A and 54B have connected thereto, at their respective inlets, lines 63 and 64 for providing steam to the heat exchangers. Heat exchangers 54A and 54B include condensate outlets (not shown) that are connected to lines that direct the condensate from the crystallizer 50. This condensate can be employed for various uses such as, for example, steam production. Lines 51A and 51B, respectively, are connected between the liquid inlets of the heat exchangers 54A and 54B and the outlets of recirculation pumps 56A and 56B which direct liquid (evaporator blowdown in this case) to the heat exchangers to exchange heat with the heat source directed into the heat exchangers. Line 53A connects the conditioned liquid outlet of heat exchanger 54A to the inlet of compartment or section 52A of the crystallizer body 52. Similarly, line 53B connects the conditioned outlet of heat exchanger 54B to the inlet of compartment 52B of the crystallizer body 52. Lines 55A and 55B connect outlets of compartments 52A and 52B, respectively, to inlets of pumps 56A and 56B. Thus, it is seen that first and second circulation loops 70 and 72 are formed and form a part of the crystallizer 50. First recirculation loop 70 includes line 55A, recirculation pump 56A, line 51A, heat exchanger 54A and line 53A that joins or connects to section 52A of the crystallizer body 52. Likewise, second circulation loop 72 comprises line 55B, recirculation pump 56B, line 51B, heat exchanger 54B, and line 53B that joins or connects to section 52B of the crystallizer body 52.

There is provided a brine feed line 34B that is operatively connected between a pump 61A and the inlets of both inlet valves 57A and 57B. The outlet of valve 57A is connected to line 55A and the outlet of valve 57B is connected to line 55B. This arrangement permits the selective direction of the evaporator blowdown or concentrated brine supplied from pump 61A to the first circulation loop 70 and the second circulation loop 72.

The outlet of pump 56A is also connected to the inlet of a purge valve 59A, and the outlet of pump 56B is connected to the inlet of another purge valve 59B. The outlets of purge valves 59A and 59B are connected via line 62 to the inlet of a crystallizer slurry pump 62B. This arrangement enables selective purging of highly concentrated evaporator blowdown from the first and second circulation loops 70 and 72 of the crystallizer 50.

Crystallizer 50, used in the process shown in FIG. 1 is operative to increase the total solids concentration of the evaporator blowdown. The dual compartment structure of the crystallizer body 52, coupled with the first and second circulation loops 70 and 72, enables the total solids concentration to increase over two stages of operation. That is, a first total solids concentration increase occurs while the liquid is circulating in one of the circulation loops and the second total solids concentration increase occurs while the liquid is circulating in the other circulation loop. More particularly, crystallizer 50 operates such that in a steady state condition the total solids concentration of the liquid circulating in one of the loops is generally substantially lower than the total solids concentration of the liquid circulating in the other circulation loop.

An appreciation may be gained for the operation of crystallizer 50 by considering a steady state operation where valves 57A, 59A and 59B are closed and inlet valve 57B is open. In this condition, assume that the levels of liquid in compartments or sections 52A and 52B are equal. Further, it may be considered that the total solids concentration of the liquid circulating in the first loop 70 is greater than the total solids concentration of the liquid circulating in the second loop 72. This condition arises due to inlet valve 57A being closed such that there is no direct delivery of the evaporator blowdown to the first circulation loop 70. In this case, the first circulation loop 70 is referred to as a high total solids concentration loop, while the second circulation loop 72 is referred to as a low total solids concentration loop. Likewise, compartment 52A is referred to as a high solids concentration side of the crystallizer body 52, while compartment or section 52B is referred to as a low solids concentration side of the crystallizer body.

As the circulation of evaporator blowdown continues in the two circulation loops 70 and 72, the total solids concentration in each loop or side of the crystallizer body 52 will continually increase. When the total solids concentration in the first circulation loop 70, now the high solids concentration loop, reaches a pre-determined or set value, purge valve 59A is open permitting concentrated evaporator blowdown to be directed away via line 62 and pump 62B. This results in a lower level or head of the evaporator blowdown in section 52A. This lower level or head induces flow from compartment 52B through opening 52D into compartment or section 52A. The flow of evaporator blowdown from the low total solids concentration side to the high total solids concentration side dilutes the evaporator blowdown circulating in the high concentration side. It may be considered that this dilution of the high concentration side can, in effect, clean the components of the high concentration side. This may extend the time between deep cleaning operations which would result in downtime and process stoppages. When the dilution reaches a pre-determined level, purge valve 59A and inlet valve 57B are closed, and inlet valve 57A is opened. This admits evaporator blowdown from line 61 into the first circulation loop 70; that is, the circulation loop powered by recirculation pump 56A. The roles of the first and second circulation loops now reverse with the second loop, circulation loop 72, now operating as the high solids concentration loop and the first loop 70 operating as the low solids concentration loop. Evaporation continues until the total solids concentration in the second circulation loop 72 reaches a pre-determined upper level which, in one embodiment, is 70-75% total solids concentration. At this time, purge valve 59B is opened to permit the further concentrated evaporator blowdown from the second circulation loop 72 to be directed into line 62 and pumped away by pump 62B. This lowers the level or head in section 52B, causing the liquid or evaporator blowdown in compartment 52A to move into compartment 52B. As discussed above, this step dilutes the evaporator blowdown in the second circulation loop 72 and when the total solids concentration in the second circulation loop drops to a pre-determined level, valves 59B and 57A are closed. Inlet valve 57B is opened and the roles of the two circulation loops 70 and 72 are again reversed.

This cyclic process continues until operating conditions require deep cleaning of the crystallizer 50. It is contemplated, however, that the described cyclic process enables extended operation between deep cleaning stoppages as compared to a single compartment crystallizer operating under conventional conditions. Moreover, it has been observed that greater total solids concentrations can be achieved as compared to single compartment.

In the process depicted in FIG. 1, as noted above, the evaporator blowdown directed to the crystallizer 50 typically has a total solids concentration of approximately 20-25%. The crystallizer 50 is effective to increase the total solids concentration on the low side of the crystallizer to approximately 50-60% TS. Further, the crystallizer 50 is effective on the high solids side to increase the concentration of the evaporator blowdown or liquid to 70-75% TS.

There are numerous advantages to the process described above. As noted before, the crystallizer 50 concentration process carried out by the crystallizer causes the evaporator blowdown to be concentrated from 20-25% TS to 70-75% TS. This produces a substantially higher solids concentration in the evaporator blowdown compared to the expected concentrations that might be found in conventional concentrating systems. Conventional crystallizers used in SAGD processes typically achieve concentration at 55-65% TS. The ability of conventional crystallizers to further concentrate evaporator blowdown is limited by the viscosity of the evaporator blowdown, scaling, and the energy required to evaporate the concentrated blowdown. In the case of the crystallizer 50 and the process discussed herein, the split design of the crystallizer helps reduce the energy consumption because the majority of the evaporation duty is realized by the low solids side of the crystallizer.

The brine from the Ultra High Solids Crystallizer can further be treated in a Zero Liquid Discharge (ZLD) approach using a dryer, such as, for example, a double drum dryer. The ZLD option further concentrates the produced water to a Total Solids content of approximately 90-99.9%.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of recovering oil from an oil-bearing formation, comprising:
   a. recovering an oil-water mixture from the oil-bearing formation;
   b. separating oil from the oil-water mixture to produce oil and produced water having hardness therein;
   c. directing the produced water to an evaporator and evaporating at least a portion of the produced water to produce a concentrated brine and steam;
   d. directing at least a portion of the brine through a crystallizer having first and second circulation loops and concentrating the brine in the first loop and transferring the brine from the first loop to the second loop and further concentrating the brine in the second loop;
   e. purging at least some of the brine from the second loop;
   f. condensing the steam to generate a distillate;
   g. directing the distillate to a steam generator and heating the distillate in the steam generator to produce steam; and
   h. injecting the steam produced by the steam generator into an injection well.

2. The method of claim 1 including alternating feeding the brine to the first and second circulation loops such that during one time period the brine is fed to the first circulation loop and during a second time period the brine is fed to the second circulation loop.

3. The method of claim 1 wherein the crystallizer includes a body divided into two sections where one section operates at a relatively low solids content and the other section operates at a relatively high solids content and wherein the brine in the crystallizer can be transferred back and forth between the two sections.

4. The method of claim 2 wherein the extent of concentrating the brine is staged such that in one concentration loop the brine is concentrated to a first level and in the other concentration loop the brine is further concentrated to a higher concentration level.

5. The method of claim 4 wherein at least some of the brine in the first circulation loop flows from the first circulation loop to the second circulation loop in response to brine being purged from the second circulation loop.

6. The method of claim 1 including concentrating the brine to approximately 50-60% TS in the first circulation loop and concentrating the brine to approximately 70-75% TS in the second circulation loop.

7. A method of recovering oil from an oil-bearing formation, comprising:
   a. recovering an oil-water mixture from the oil-bearing formation;
   b. separating oil from the oil-water mixture to produce oil and produced water having hardness therein;
   c. directing the produced water to an evaporator and evaporating at least a portion of the produced water to produce a concentrated brine and steam;
   d. condensing the steam to form a distillate;
   e. directing the distillate to a steam generator and heating the distillate in the steam generator to produce steam;
   f. injecting the steam produced by the steam generator into an injection well;
   g. directing the brine produced by the evaporator to a split crystallizer having first and second circulation loops communicatively connected to permit liquid to flow from one circulation loop to the other;

h. in one mode:
   i. feeding the brine from the evaporator to the first circulation loop and concentrating the brine in the first circulation loop;
   ii. after concentrating the brine in the first circulation loop transferring the brine to the second circulation loop and further concentrating the brine;
   iii. purging at least some of the further concentrated brine from the second circulation loop; and
i. in a second mode:
   i. feeding the brine from the evaporator to the second circulation loop and concentrating the brine in the second circulation loop;
   ii. after concentrating the brine in the second circulation loop, transferring the brine to the first circulation loop and further concentrating the brine; and
   iii. purging at least some of the further concentrated brine from the first circulation loop.

8. The method of claim 7 including switching back and forth between the two modes.

9. The method of claim 7 wherein brine is transferred from the first circulation loop to the second circulation loop while brine is being purged from the second circulation loop and wherein brine is transferred from the second circulation loop to the first circulation loop while brine is being purged from the first circulation loop.

10. The method of claim 7 wherein in either mode the majority of evaporation duty is realized in the section of the crystallizer being fed with the brine from the evaporator.

11. A system for treating produced water separated from an oil-water mixture recovered in an oil recovery process, the system comprising:
   an evaporator for evaporating the produced water and producing an evaporator blowdown and steam that is condensed to form a distillate;
   a dual stage crystallizer for concentrating the evaporator blowdown, the dual stage crystallizer having a body that is divided into first and second sections;
   the crystallizer including a first circulation loop communicatively connected to the first section of the body of the crystallizer for concentrating the evaporator blowdown circulated therein;
   the crystallizer further including a second circulation loop communicatively connected to the second section of the body of the crystallizer for concentrating the evaporator blowdown circulated therein; and
   the crystallizer configured to transfer evaporator blowdown back and forth between the first and second circulation loops such that the evaporator blowdown is concentrated in one circulation loop and further concentrated in the other concentration loop.

12. The system of claim 11 wherein each of the first and second recirculation loops include a heat exchanger, a recirculation pump, and one or more valves.

13. The system of claim 11 wherein the body includes a baffle that generally isolates the first section from the second section, and wherein the baffle includes an opening that permits liquid communication between the first and second sections.

* * * * *